UNITED STATES PATENT OFFICE.

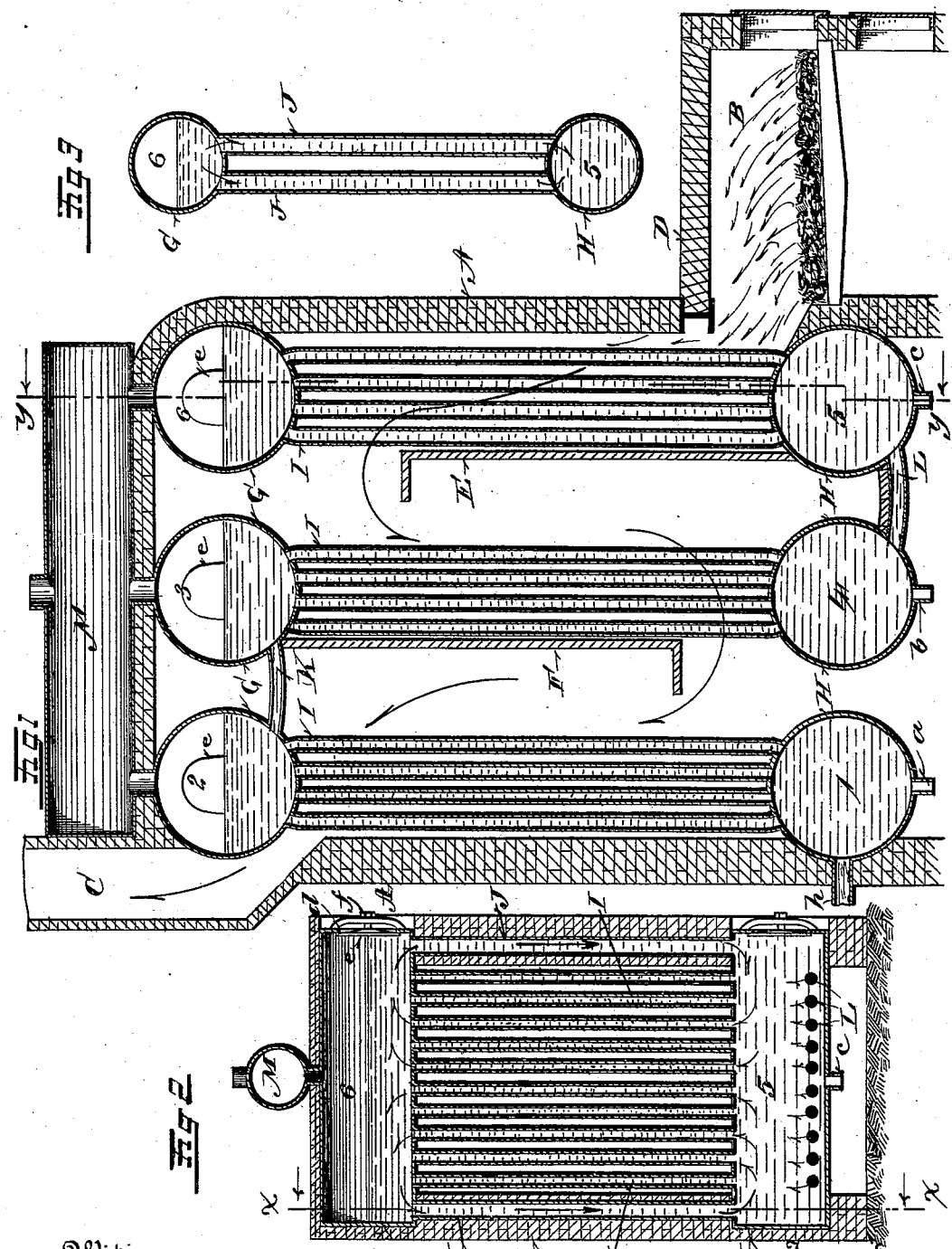

ALVARO S. KROTZ, OF SPRINGFIELD, OHIO, ASSIGNOR OF ONE-THIRD TO EDWARD C. GWYN, OF SAME PLACE.

STEAM-BOILER.

SPECIFICATION forming part of Letters Patent No. 551,590, dated December 17, 1895.

Application filed February 18, 1895. Renewed October 2, 1895. Serial No. 564,432. (No model.)

*To all whom it may concern:*

Be it known that I, ALVARO S. KROTZ, a citizen of the United States, residing at Springfield, in the county of Clark and State of Ohio, have invented certain new and useful Improvements in Steam-Boilers, of which the following is a specification, reference being had therein to the accompanying drawings.

This invention relates to certain new and useful improvements in water-tube steam-boilers. I have in view two distinct but co-operating principles or modes of operation which lie at the basis of my invention. Accordingly I shall first state these principles or operations. They consist, first, in providing for a complete circulation of the water from one drum to the other and back again continuously in each battery or set of drums, the up movement of the water corresponding with the natural rising of the steam generated in the tubes, and, second, in providing water communication between the second drum of the first battery with the first drum of the second battery and the second drum of the second battery with the first drum of the third battery and so on through as many batteries as may be employed. The result produced is, first, that each battery has a perfect circulation within itself, and, second, that the water is warmed or heated in the first battery for the second battery, and more highly heated in the latter for the third battery, and so on through as many batteries as may be used.

As the feed-water is merely sufficient to compensate for evaporation it flows in slowly and mixes with the circulating water in the first battery and so does not pass into the second battery as a distinct more or less cold body and thence into the third battery as a more or less cold body, but to the contrary is taken up and mixed with the circulating water of the first battery and in this state passes from battery to battery, so that only the feed-drum of the first battery is subject to the chilling effects of the feed-water. This perfect circulation in each battery and this system of intercommunication between the several batteries produces a boiler of highest efficiency and greatest economy in the consumption of fuel.

In the accompanying drawings, on which like reference letters and numerals indicate corresponding parts, Figure 1 represents a vertical sectional view of my improved boiler embodying the above principles; Fig. 2, a vertical transverse sectional view on the line $y\,y$ of Fig. 1; and Fig. 3 a transverse sectional view of one battery in detail, the section being on the line $x\,x$ of Fig. 2.

The letter A designates a suitable brick-housing including a fire-box B and a flue or chimney C. The fuel is placed in the fire-box B whose crown-wall D being of fire-brick becomes intensely hot and so avoids chilling the products of combustion as is the case when these products are allowed on rising from the bed of fuel to come first in contact with a water-backed surface, as water-tubes, before the combustion has reached its most perfect condition. The products of combustion passing from the fire-box beneath the crown-plate D travel in the tortuous path indicated by the arrows, being so directed by the baffle-plates E and F. Within this housing of masonry I place a series of what I term "batteries," more than two being preferred. These batteries each consist of an upper and lower drum G and H, respectively, a bank of connecting-tubes I for the up current and a bank of connecting-tubes J for the down or return current. These batteries are preferably arranged with the tubes in a substantially vertical position, as the boiler is more compact in this form. I designate the drums of each battery as 1 2 3 4 5 6, as shown by these numerals on the drawings. The water is fed into drum No. 1 by a feed-pipe $h$, which is also a mud-drum. Thence it flows into drum No. 2, which is a steam-drum; thence into drum No. 3, which is a steam-drum; thence into drum No. 4, which is a water-drum; thence into drum No. 5, which is also a water-drum, and thence into drum No. 6, which is a steam-drum. It will be seen that drums Nos. 2 and 3 are connected by water-tubes K and drums Nos. 4 and 5 are similarly connected by water-tubes L. The steam-drums 2, 3, and 6 are interconnected by a steam-drum M, which being remote from the water renders the steam drier when drawn off.

Now it will be seen that there is a circulation of water between the drums of each battery, being upward through the tubes I and downward through the tubes J, and that there are as many distinct and independent circulating bodies of water as there are batteries. It will further be seen that the incoming feed-water mixes with the circulating water in the first battery and that there is no communication between the first and second batteries except from the second drum of the first battery to the first drum of the second battery; and that there is no communication between the second and third batteries except from the second drum of the first battery to the first drum of the third battery. Hence the supply of water to the second battery comes from the circulating water of the first battery and not directly from the water and that the supply to the third battery comes from the circulating water of the second battery. This system of independent circulation in each battery and feeding of one battery from the other carries out the principles hereinabove stated and gives to this boiler its high efficiency in the generation of steam and its economy in the consumption of fuel. Then, too, the effect of thorough and perfect circulation in each battery keeps the tubes clear of scale, as they are washed or slushed out by the rapidly-moving columns of water. The only place where the sediment can collect is in the lower part of the mud-drums 1 and the water-drums 4 and 5, whence it is drawn off through orifices *a b c*, which in practice are controlled by a suitable cock. I also prefer to protect the circulating-tubes J from the heat by screening them within the side walls of the brickwork, as seen in Fig. 2, so that they will be prevented from becoming as hot as the other tubes and hence will carry the water downward. I also prefer to provide the drums with manholes *d*, covered by inner manheads *e*, held in place by a lock and bolt *f*, so as to give access to the interior for cleaning, and particularly for cleaning the tubes I and J.

It will be seen that the tubes J are larger than the tubes I. This facilitates the circulation. Also that the tubes J are in pairs. (See Fig. 3.)

Having thus fully described my invention, what I claim as new, and desire to secure by Letters Patent, is—

1. In a water tube boiler, the combination with a plurality of batteries, each consisting of drums and up-current and down-current water-circulating tubes, so that each battery has complete water circulation in itself, the first drum of the first battery receiving the water, and water-connecting tubes in alternating positions between the upper and lower drums as follows: namely, between the second drum of the first battery and the first drum of the second battery, and between the second drum of the second battery and the first drum of the third battery, and so on according to the number of batteries used, so that subsequent drums are fed with water from adjacent previous drums in the system.

2. In a water tube boiler, a battery consisting of two drums, up-current and down-current circulating tubes connecting the batteries together, the down-current tubes being larger than the others and arranged in pairs.

In testimony whereof I affix my signature in presence of two witnesses.

ALVARO S. KROTZ.

Witnesses:
W. M. McNAIR,
JAS. C. DAWLEY, Jr.